(12) United States Patent
Mayhew et al.

(10) Patent No.: US 6,694,326 B2
(45) Date of Patent: Feb. 17, 2004

(54) GRAPHICAL FILTER DIALOG WINDOW SYSTEM AND METHOD FOR SAME

(75) Inventors: Debra Lee Mayhew, Morgan Hill, CA (US); Amy Chang, San Jose, CA (US); Michael Leon Pauser, Morgan Hill, CA (US); Tu-An Cheng, Cupertino, CA (US); Lara Hamilton Cone, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 09/837,051

(22) Filed: Apr. 18, 2001

(65) Prior Publication Data

US 2002/0156794 A1 Oct. 24, 2002

(51) Int. Cl.[7] .............................................. G06F 17/30
(52) U.S. Cl. ............................... 707/102; 707/3; 707/4
(58) Field of Search .............................. 707/3, 4, 100, 707/539; 715/512, 511, 500; 345/863, 348, 634, 427; 709/201, 103; 703/1

(56) References Cited

U.S. PATENT DOCUMENTS

| 5,812,840 A | * | 9/1998 | Shwartz | 707/4 |
| 5,926,806 A | | 7/1999 | Marshall et al. | 707/3 |
| 5,963,938 A | * | 10/1999 | Wilson et al. | 707/4 |
| 6,101,493 A | * | 8/2000 | Marshall et al. | 707/3 |
| 6,326,962 B1 | * | 12/2001 | Szabo | 345/762 |
| 2002/0026355 | * | 2/2002 | Mitsuoka et al. | 705/14 |

* cited by examiner

*Primary Examiner*—Charles Rones
(74) *Attorney, Agent, or Firm*—Fay, Sharpe, Fagan, Minnich & McKee, LLP

(57) ABSTRACT

A dialog window for use in a filtering process provides filtering criteria based upon a limited number of object properties. Each property has an associated criterion input comprising an operator input and a value input which together with the associated property specify a filtering criterion. The dialog window preferably includes a limited number of properties, such as two or three properties, for simplicity and ease of use. Each property further has a selector in the form of a check box by which the user selects the operant filter criteria. The dialog window additionally includes a count button by which the user may update a count display which indicates the number of objects which will be returned using the presently entered filtering criteria.

18 Claims, 5 Drawing Sheets

GRAPHICAL FILTER DIALOG WINDOW SYSTEM AND METHOD FOR SAME

BACKGROUND OF THE INVENTION

The present invention relates to a graphical user interface (GUI), and more particularly to an improved graphical filter dialog window system through which the user enters user-defined criteria for a data filtering process.

GUI interfaces are well known to the art. They employ graphical representations, or icons, of programs, applications, data files, and other computing objects. Icons and other interactive display elements are grouped into windows which may be any size up to and including the maximum screen size. The user "executes" an icon using a pointing device such as a mouse, track ball, touch-sensitive screen, or the like. Icon execution is dependent upon the icon type. For example, executing a program icon may run the program, executing an image file icon may display the image, and executing a folder icon may display the folder contents in a new window. Often, additional user control is available through "popup" menus which may be brought up by operating the pointing device in an alternate manner on an icon. Popup menus may advantageously be context-sensitive in that the displayed menu options can be made to depend on icon association.

FIG. 1 shows a typical popup menu 10. The icons serve as launch points for additional dialog windows which display one or more input controls in one or more windows formatted in a convenient, readily comprehensible manner, such as an entry form. The individual input controls may take various forms such as text entry boxes, drop-down list boxes, check boxes, radio buttons, push buttons, or the like. GUI interfaces run on widely adopted commercial, business and personal computer operating systems such as the Microsoft Windows server, UNIX X-Windows, IBM OS/2, Linux, HP, and SUN operating systems. GUI interfaces are also used for most programs which run under these operating systems.

Data filtering, based upon user-defined criteria, is an important computing operation which occurs in many computing applications. For example, the operating system usually provides at least one filter for selecting files satisfying user-defined parameters, as exemplified by the "Find" operation provided in Microsoft Windows. Applications, such as databases, use filtering to select and present relevant information from a collection of objects, and such filtering is essential for managing large databases and complex data tree structures.

The prior art teaches the use of a graphical filter dialog window as the preferred approach for entry of user-desired filtering criteria in a GUI environment. The usual process is that the user enters the criteria in the graphical filter dialog window and then initiates the filtering process by operating on an "OK" button, "Start" button, or other intuitive option also contained within the filter dialog window. The computer then performs the filtering process and identifies objects meeting the filtering criteria, typically by displaying icons corresponding to the identified objects in a new window for easy user access. The filtered objects may be organized in a list or other structure. As shown in FIG. 1, the right hand pane contains the search results, however, the results can be displayed as a separate window as well.

Exemplary prior art graphical filter dialog notebooks are shown in FIGS. 2 and 3, where the filter selects objects, in the illustrated case tables, stored by a database program which meet the user-defined criteria. In the descriptions to follow, the expressions "window(s)" and "notebook(s)" will be used interchangeably and are meant to refer to the GUI interface illustrated and other equivalent user interfaces. FIG. 2 shows a basic dialog window 20 corresponding to a default "Locate" tab 22. This window appears when the user selects the "Filter" option 12 from a popup menu 10 associated with a database 14, as illustrated in FIG. 1. The notebook page shown in FIG. 3 appears when the user clicks on the "advanced" tab of the filter notebook shown in FIG. 2.

It will be observed that the prior art dialog window 20 shown in FIG. 2 provides no fewer than fifteen text input 24 and drop-down list 26 boxes under the "Column" 28, "Comparison" 30, and "Values" 32 headings. Additionally, up to seven additional selection buttons 34 and radial selectors 36 are provided. Still more user selections are illustrated in FIG. 3, which shows a second filter dialog window 40 obtainable by selecting the "Advanced" tab 42 in FIG. 2. The Advanced tab 42 provides the large input box 44 shown in FIG. 3 in which the user may enter filtering criteria 46 in an application-specific language, such as a variant of the structured query language (SQL) commonly employed in database software. These prior art dialog windows provide the user with a vast array of powerful filtering criteria options.

However, these prior art graphical filter dialog windows also suffer from a number of disadvantages. Users, especially novice users, typically find complex dialog windows such as those shown in FIGS. 2 and 3 to be complicated and intimidating. It is not immediately clear what search results are obtained when a value input is left blank or how many results will be returned. The filter may ignore the corresponding column and return only those tables for which that column has a blank value. Alternatively, the filter may return all table values where the values column is left blank.

In response to this ambiguity, novice users are often compelled to provide entries in each of the five value text boxes 24, even though only one or two filtering criteria may be required. The superfluous entries may have no effect, or worse, may constrain the filtering process in some unintended manner. Similar confusion may arise if two or more column entries are identical, for example two Name column entries with different value entries. Whether the system performs an AND or OR logical function is unclear to the user. It is also not clear whether leaving the top row blank and entering filtering criteria into lower rows is permissible. The novice user in particular usually has no need or desire to construct complex filtering criteria, and would prefer a simplified and intuitive graphical filter dialog window.

Another problem with prior art graphical filter dialog windows is that they provide no indication prior to initiating the filtering process as to how many objects will be returned. The filtering and identifying of the located objects may be quite time consuming, especially if the filtering criteria is inadvertently broad, resulting in a large number of located objects. In such a case, the user must re-start the filtering process. It would be valuable for the user to know ahead of time how many objects will be returned for a particular set of user-defined criteria prior to initiating the filtering, so that the criteria may be modified to identify a reasonable number of objects.

The present invention contemplates an improved graphical filter dialog window system and method which overcomes these limitations and others.

SUMMARY OF THE INVENTION

In accordance with one aspect of the present invention, a dialog window for entering user-defined filtering criteria for identifying certain objects within a group of objects is disclosed. A criteria input provides for specifying, together with an associated object property, filtering criteria. A numeric display shows the number of objects which satisfy the user-defined filtering criterion. A button provides for initiating the filtering.

In accordance with another aspect of the present invention, a method for filtering a database and identifying objects located by the filtering is disclosed. Filtering criteria is received from an associated user through a dialog window which includes a plurality of inputs, each input together with an associated object property specifying a filtering criterion and each input further having a selector operable by the associated user. The database is filtered, the filtering based only upon the filtering criteria selected during the receiving. The objects located by the filtering are identified.

In accordance with yet another aspect of the present invention, a dialog window for entering user-defined filtering criteria by which certain objects within a collection of objects may be identified is disclosed. A criterion input is provided for specifying a range of values of an associated property of the objects in the collection. A selector corresponding to the criterion input is also provided, whereby the user indicates whether filtering will be performed with respect to the property. A button is provided for initiating the filtering.

One advantage of the present invention is that it provides a less intimidating user interface, especially for the novice user.

Another advantage of the present invention is that it clarifies which filtering criteria are operative.

Another advantage of the present invention is that it reduces the amount of user input necessary to implement the filtering operations most often employed.

Yet another advantage of the present invention is that it provides the user with a count of the number of objects which will be identified using a given set of filtering criteria before filtering actually occurs, so that the user can efficiently optimize the filtering criteria to identify a reasonable number of objects.

Still further advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

DETAILED DESCRIPTION OF THE PREFERRED EMBODIMENTS

The invention will be described with exemplary reference to a database of table objects. However, it is to be appreciated that the invention is not so limited, and is generally applicable to any filtering operation wherein a particular set of objects is identified from a collection of objects based upon user-defined criteria.

Figure 2:
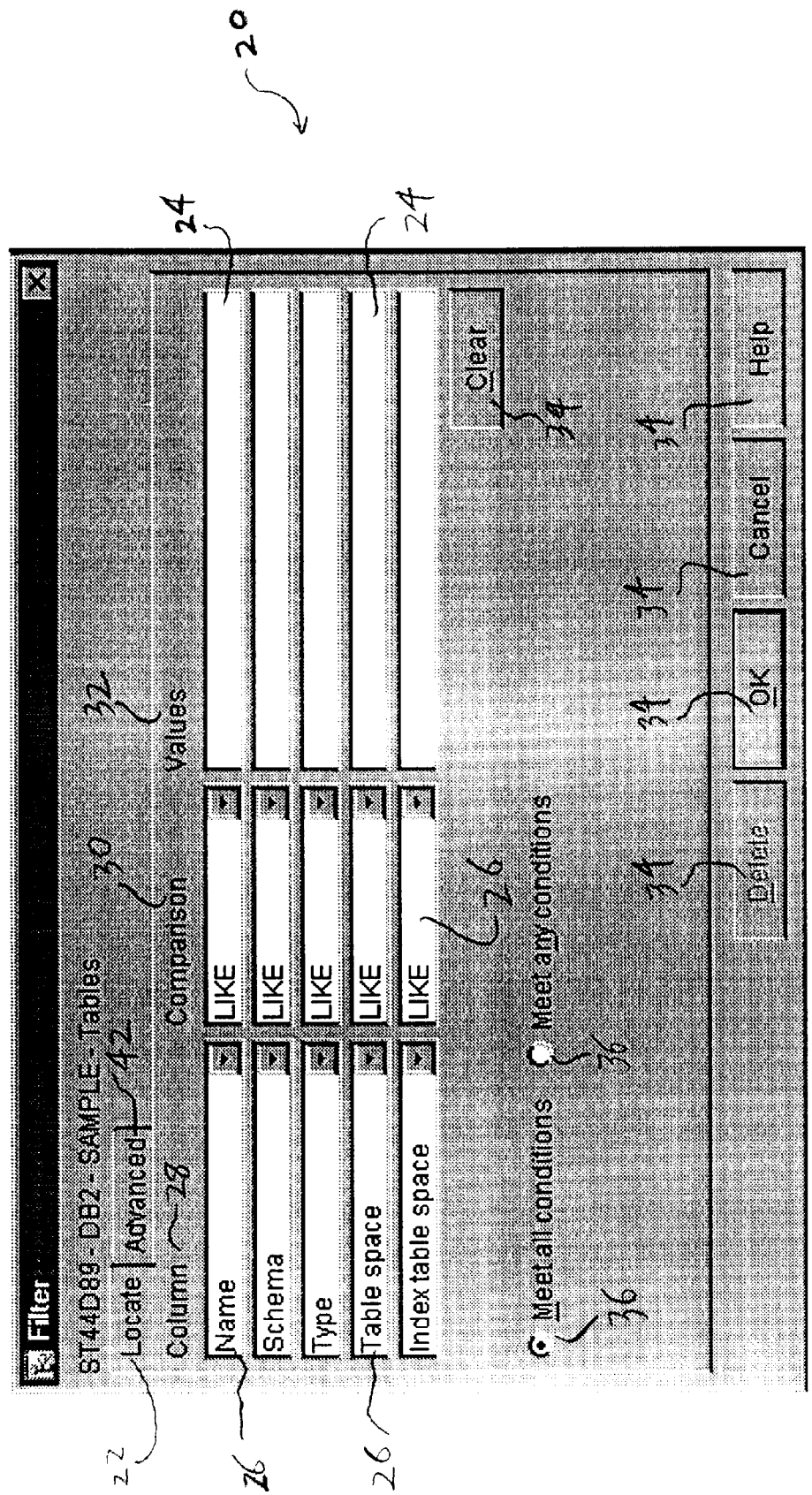
FIG. 2 (Prior Art) is a pictorial diagram of a main screen of a default graphical filter dialog window as taught by the prior art.
Figure 3:
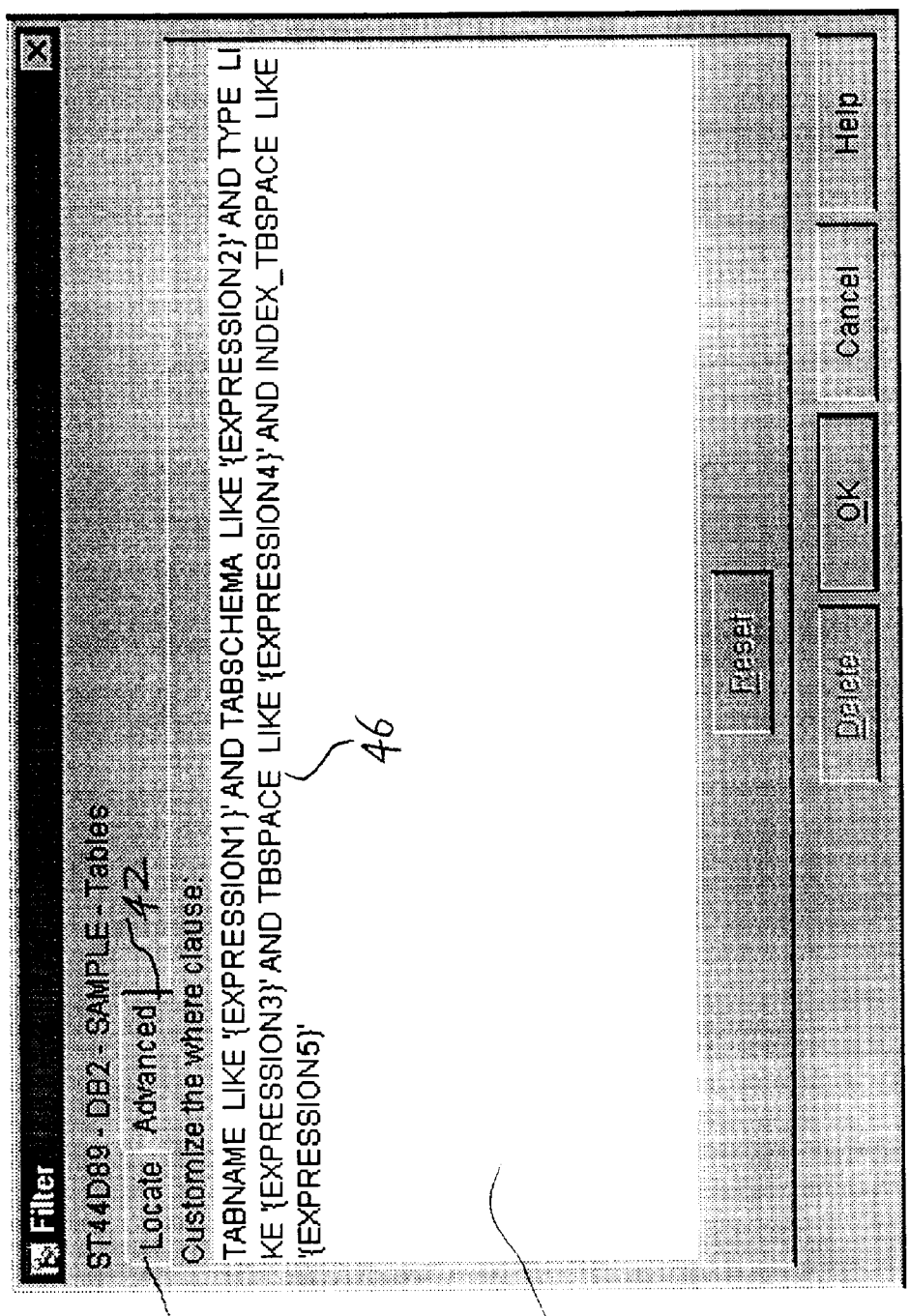
FIG. 3 (Prior Art) is a pictorial diagram of a main screen of an advanced graphical filter dialog window as taught by the prior art.
Figure 4:
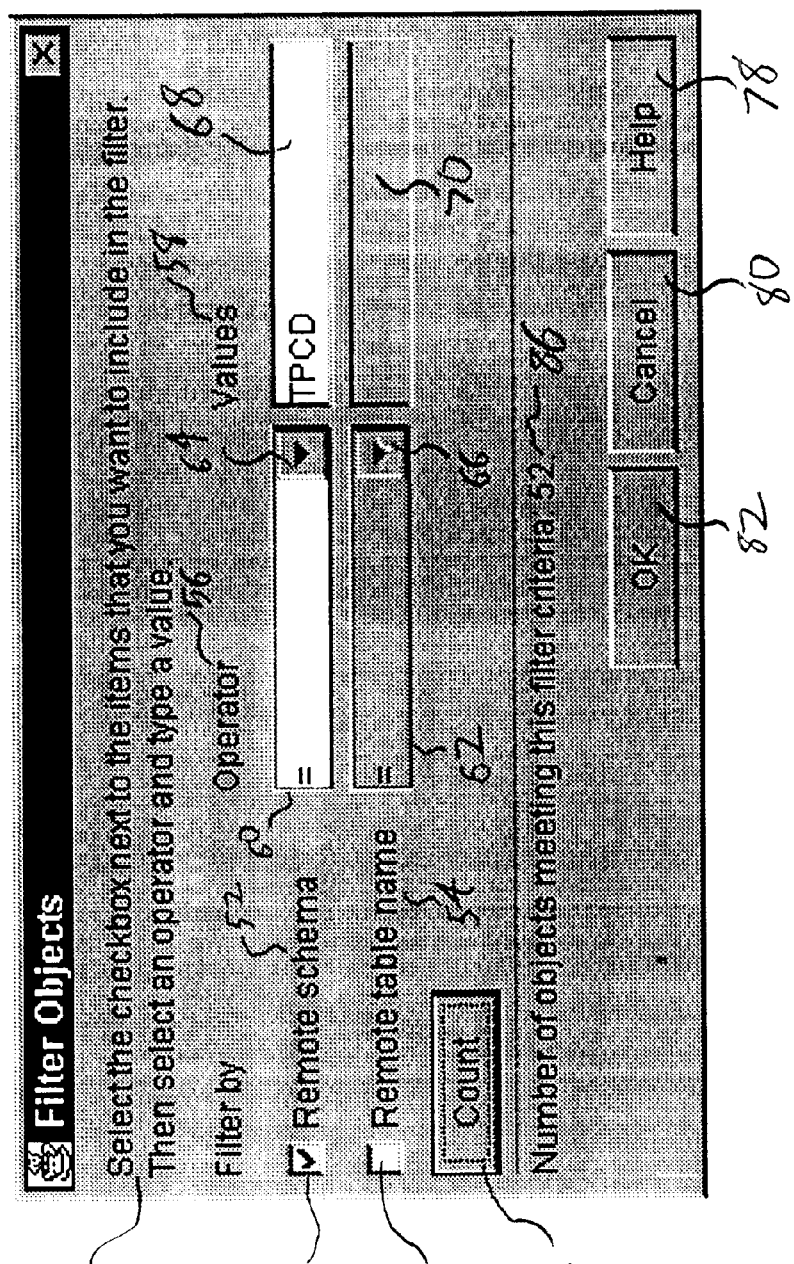
FIG. 4 is a pictorial diagram of a main screen of the preferred graphical filter dialog window of the present invention.

FIG. 4 shows the preferred embodiment of the graphical filter dialog window 50 in accordance with the present invention. Dialog window 50 provides filtering criteria based on two properties of the database objects, specifically "Remote schema" 52 and "Remote table name" 54. Of course, additional or other properties may be included in the dialog box, but it is contemplated that the preferred embodiment includes only a limited number of the most commonly used filtering criteria. The number of criteria is preferably limited to a small set such as, for example, two or three common criteria to provide a simple, intuitive, and user-friendly interface. It will be particularly noted that the properties 52, 54 are fixed and not editable by the user. This contrasts with the prior art filter dialog boxes such as the exemplary dialog box shown in FIG. 2, wherein the user may select from a number of different properties using inputs 26 below the "Column" heading.

Each property includes a criteria input comprising one or more inputs by which is; the user may specify a range of values for the property. Each fixed, uneditable property 52, 54, coupled with the user criterion input specifying a range of values for the property, defines filtering criteria for the filtering process. In the preferred illustrated embodiment, the criteria input includes two inputs for each property: an "Operator" input 56 and a "Values" input 58. Each operator input is preferably a drop-down list box 60, 62. Drop down list boxes provide a list of options when an associated down-arrow button 64, 66 is selected. The operator list preferably includes only those operators appropriate to the data type of the property. For a character type, appropriate operators may include at least: =, <>, <, <=, >, >=, LIKE, NOT LIKE, IS NULL, IS NOT NULL, IN, NOT IN, and the like. For a numeric type, appropriate operators may include at least: =, <>, <, <=, >, >=, IS NULL, IS NOT NULL, BETWEEN, NOT BETWEEN, and the like. Such operators are well known to those skilled in the art and need not be described in detail for an enabling disclosure of the invention. It will be noted that the = operator is the default operator selected for both operator inputs 60, 62 in FIG. 4, but of course any operator included in the drop-down list may be selected.

Each "Values" input 68, 70 is preferably a text input box. Preferably, the user may enter multiple values therein separated by commas. Multiple values entered into values input 68 or values input 70 are preferably treated using an OR operation. For example, if the TPCD value in value input 68 is replaced by "TPCD,DWSCH", then any table whose "Remote schema" property is equal (=) to TPCD or DWSCH will satisfy the "Remote schema" criterion. The relationship between different properties is preferably conjunctive, e.g. the "Remote schema" criterion and the "Remote table name" criterion must be satisfied for a given object in order for the filter to identify the object.

Each criterion input and associated property 52, 54 also has an associated selector, illustrated in FIG. 4 as check boxes 72, 74. The user selects a property for use in the filtering process by selecting that property using its associated selector. Thus, in FIG. 4 the "Remote schema" property 52 is selected as indicated by the checked box 72, whereas the "Remote table name" property 54 is unselected as indicated by the unchecked box 74. Filtering is preferably executed based only on the selected properties. Preferably, an unchecked property will have inoperative filter inputs, and will furthermore be "grayed out" in the filter dialog window on the main screen, as shown for inputs 62 and 70 in FIG. 4, to minimize user confusion. In this manner, it is intuitively clear to the user which properties are selected for filtering. To be completely explicit, however, it is useful to include a short explanatory statement exemplified by statement 76 to aid novice users. In the preferred embodiment illustrated, all "Remote table names" are returned and the filtering operation is performed based only according to the "Remote schema" criteria.

The graphical filter dialog window 50 preferably also contains conventional GUI window controls such as the "Help" button 78 whereby the user may view additional helpful text in a separate window. The "Cancel" button 80 cancels the filtering operation and closes dialog window 50, while the "OK" button 82 initiates the filtering process. Preferably, the "OK" button 82 is always active and operable. In the event that no filtering criteria have been selected (i.e., all check boxes are unchecked, or those boxes which are checked have no values entered), operating the "OK" button will preferably return all objects in the collection.

As discussed previously, it is valuable for the user to have advance knowledge regarding the number of objects which will be identified by the filtering process prior to initiating the filtering process. In the preferred embodiment illustrated in FIG. 4, this feature is implemented by a Count button 84 used in conjunction with count display 86. As will be discussed below, each time the user operates Count button 84, the computer determines the number of items which would be identified by the filtering process using the filtering criteria presently specified via user inputs 60, 62, 68, 70, 72, and 74, and, thereafter, displays the number in count display box 86.

Figure 1:
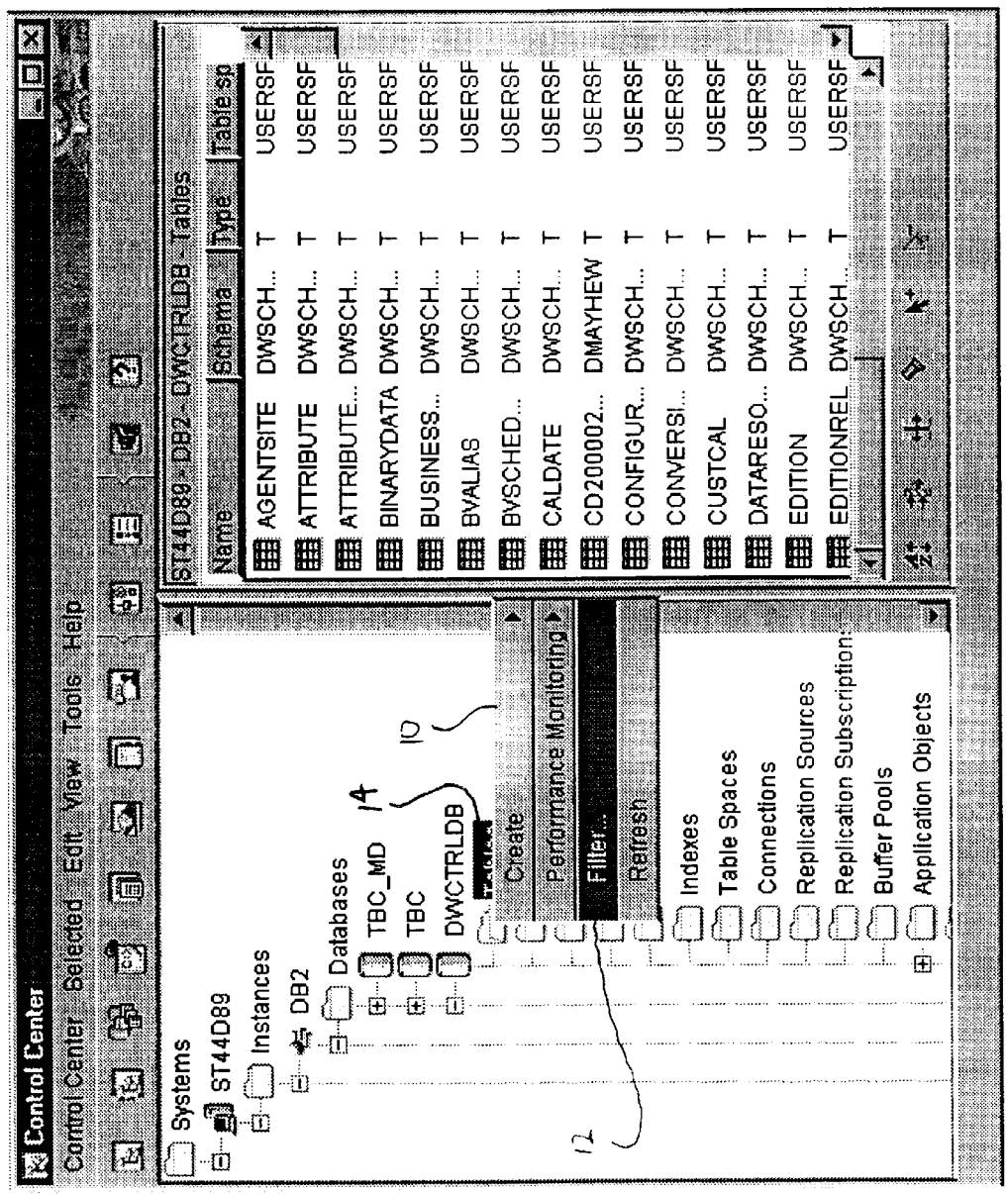
FIG. 1 (Prior Art) is a pictorial diagram of a main screen showing prior art selection of a filtering operation using a popup menu.
Figure 5:
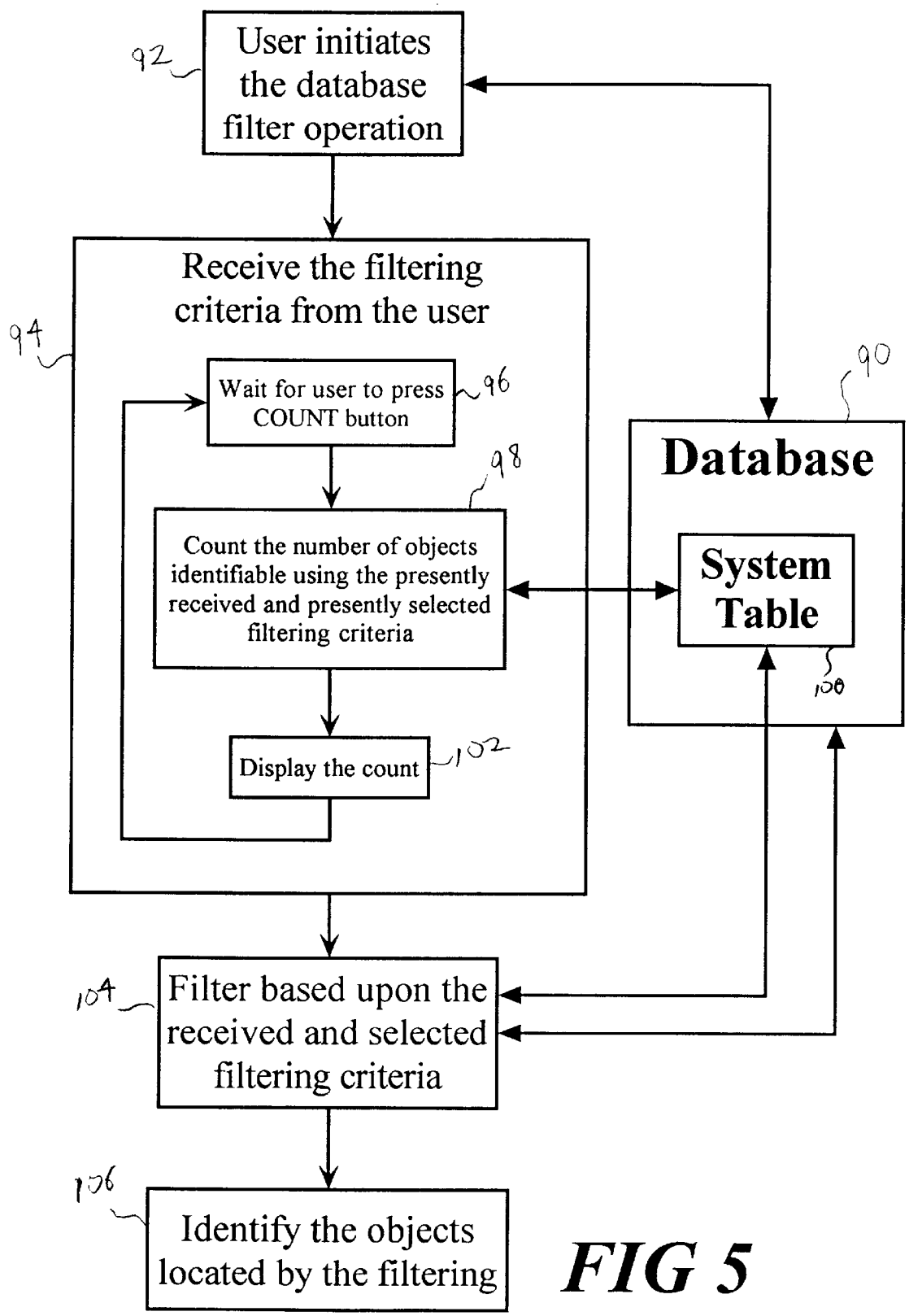
FIG. 5 is a block flow diagram of the filtering process in accordance with the present invention.

With reference next to FIG. 5, the preferred filtering process implemented using the graphical filter dialog window 50 of FIG. 4 will be described. The process will be described with respect to the exemplary database 90, but again it is to be appreciated that the filtering process is applicable to file folders and a wide range of other collections of objects. The user initiates the database filtering operation 92. This initiation may be done through any conventional GUI user action, such as through a popup window 10 as shown in FIG. 1. The initiating step 92 causes the graphical filter dialog window 50 to be displayed as shown in FIG. 4. The dialog window 50 is used to receive the filtering criteria from the user 94. The filter criteria receiving is preferably accomplished using conventional GUI inputs 60, 62, 68, 70, 72, and 74, whose operations are well known to those skilled in the art and need not be explained here in any further detail.

At any time during the filter criteria receiving process, the user may operate the count button 84. Upon pressing the count button 96 the computer counts the number of objects identifiable using the presently received and presently selected filtering criteria 98. The presently selected criteria are indicated by check boxes 72, 74. The counting may involve directly accessing the database and examining each object contained therein. However, most databases contain a system table 100 or equivalent structure which contains summary information about each object contained within the database. Similarly, an operating system usually includes a file allocation table (FAT) or similar structure which contains summary information about the files stored on the system. The FAT is equivalent to the system table for the purposes of this invention.

Preferably, the counting 98 is performed by accessing the system table 100 or any other equivalent structure. In that way, the approach used in accordance with the present invention is faster than the prior art methods of directly accessing each object within the database. After the count is complete, the count display 86 is used to display the count 102. The receiving process 94 continues, and the user then selectively modifies data inputs 60, 62, 68, 70, 72, and 74, based upon the returned count information.

Once the receiving 94 is completed as indicated for example by the user operating the OK button 82, filtering based upon the received and selected filtering criteria commences 104. As indicated in FIG. 5, the filtering process directly accesses the database 90. Preferably, the filter method receives the user's input, creates a SQL statement, executes the search against the system tables and then displays the results. The filtering process may also advantageously use information stored in the system table 100 as needed to improve the filtering speed.

After the filtering 104, the process is terminated by identifying the objects located by the filtering 106. The identifying step 106 preferably includes displaying icons representing the identified objects in a separate window or a separate panel of a window (such as shown in the right side panel of FIG. 1 by way of prior art example) whereby the user may easily access the identified objects using conventional and well recognized GUI user operations. The icons are preferably arranged in a list or in any other desired convenient manner such as a relational tree structure.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A dialog window in a graphical user interface for a display screen of a computer for entering a user-defined filtering criterion for identifying objects within a group of objects, the dialog window comprising:

a criterion input area on the display screen for specifying, together with an associated object property, a first filtering criterion;

a numeric display area on the display screen for displaying the number of objects from among said group of objects which satisfy the user-defined filtering criterion a count button area on the display screen for causing the computer to update the numeric display area based upon the first filtering criterion and selected user-defined filtering criterion; and a second button area on the display screen for initiating the filtering.

2. The dialog window according to claim 1, wherein the criterion input area on the display screen further comprises:

an operator input area; and a value input area.

3. The dialog window according to claim 2, wherein the operator input area is a drop-down list box.

4. The dialog window according to claim 3, wherein the value area is a text input area.

5. The dialog window according to claim 1, wherein the first filtering criterion includes exactly two filtering criterion.

6. The dialog window according to claim 5, wherein said two filtering criterion specify a schema filtering criterion and a name filtering criterion.

7. The dialog window according to claim 1, further comprising:
   a selector area on the display screen corresponding to the criterion input area, whereby the user selects whether the first filtering criteria is applied during the filtering.

8. The dialog window according to claim 7, wherein the criterion input area is inoperable when the selector is unselected.

9. The dialog window according to claim 7, wherein the criterion input area is visually grayed out when the selector is unselected.

10. A filtering method for filtering a database and identifying objects located in the database by the filtering, the method comprising:
   receiving first filtering criteria from an associated user through a dialog window which includes a plurality of inputs, each input together with an associated object property specifying a filtering criterion and each input further having a selector operable by the associated user;
   during the receiving step, detecting activation of a count button and, responsive to the detecting, counting the number of objects identifiable using the first filtering criteria, and displaying the count;
   terminating the receiving step responsive to activation of a second button that is different from the count button;
   responsive to the terminating of the receiving step, filtering the database, the filtering based only upon the filtering criteria selected during the receiving step; and
   identifying the objects located by the filtering.

11. The filtering method according to claim 10, wherein the plurality of inputs consist of two inputs.

12. The filtering method according to claim 11, wherein the first input specifies a schema criterion, and the second input specifies a name criterion.

13. The filtering method according to claim 10, wherein the counting step includes counting based upon information contained within a system table associated with the database.

14. The filtering method according to claim 10, wherein the detecting, counting, and displaying steps are selectively repeatable during said receiving step.

15. A method for performing selective retrieval of objects in a database, the method including:
   displaying a filter dialog window including:
      a plurality of filtering criteria operator inputs,
      a count button,
      a count display, and
      a confirmation button;
   receiving filtering criteria from an associated user via the plurality of filtering criteria operator inputs, the filtering criteria being continuously updatable during the receiving;
   responsive to a selection of the count button by the associated user during the receiving, computing a count of a number of objects satisfying the filtering criteria and updating the count display with the count, wherein the count button is continuously selectable during the receiving to selectably repeat the computing and updating; and
   responsive to an activation of the confirmation button by the associated user during the receiving, terminating the receiving and retrieving objects satisfying the filtering criteria.

16. The method as set forth in claim 15, wherein the database includes a system table containing summary information about each object contained in the database and the computing of a count includes:
   comparing the filtering criteria with summary information contained in the system table to compute the count without accessing objects of the database.

17. The method as set forth in claim 16, wherein the retrieving of objects satisfying the filtering criteria includes:
   directly accessing each object within the database.

18. The method as set forth in claim 15, further including:
   displaying icons corresponding to the retrieved objects in a window other than the filter dialog window.

* * * * *

UNITED STATES PATENT AND TRADEMARK OFFICE
CERTIFICATE OF CORRECTION

PATENT NO.     : 6,694,326 B2
DATED          : February 17, 2004
INVENTOR(S)    : Mayhew et al.

It is certified that error appears in the above-identified patent and that said Letters Patent is hereby corrected as shown below:

Column 6,
Line 46, after "objects", please insert -- in a database including a system table --;
Line 52, after "criterion", please insert -- as a count; --;
Line 54, after "update the", please insert -- count in the --;
Line 56, after "criterion", please insert -- by comparing the filtering criteria with summary information contained in the system table of the database to compute the count without accessing the objects of the database --;

Column 7,
Line 17, after "database", please insert -- including a system table, --;
Line 29, after "criteria", please insert -- as a count by comparing the filtering criteria with summary information contained in the system table to compute the count without accessing objects of the database --;

Column 8,
Line 6, after "database", please insert -- having a system table containing summary information about each object contained in the database --;
Line 6, after "the method", please delete "including:" and substitute therefor -- comprising: --;
Line 20, after "count,", please delete "wherein" and substitute therefor -- by comparing the filtering criteria with the summary information contained in the system table to compute the count without accessing objects of the database, --;
Line 21, after "the count", please delete "button is" and substitute therefor -- button being --;
Line 29, please delete the entire Claim 16 as it was canceled during prosecution; and,
Line 36, please delete "claim 16" and substitute therefor -- claim 24 --.

Signed and Sealed this

Twenty-first Day of June, 2005

JON W. DUDAS
*Director of the United States Patent and Trademark Office*